United States Patent
Bishop et al.

(10) Patent No.: US 8,997,633 B2
(45) Date of Patent: Apr. 7, 2015

(54) AIR AGITATION CONTROLLABLE BEVERAGE MAKING APPARATUS, SYSTEM AND METHOD

(75) Inventors: John Douglas Bishop, Decatur, IL (US); Charles H. Clark, Chatham, IL (US); William E. Midden, Rochester, IL (US); Randy D. Pope, Edinburg, IL (US); Suresh Radhakrishnan, Chatham, IL (US); Rex Allen Rogers, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 692 days.

(21) Appl. No.: 12/990,574

(22) PCT Filed: May 1, 2009

(86) PCT No.: PCT/US2009/042604
§ 371 (c)(1),
(2), (4) Date: Jan. 10, 2011

(87) PCT Pub. No.: WO2009/135177
PCT Pub. Date: Nov. 5, 2009

(65) Prior Publication Data
US 2011/0097465 A1   Apr. 28, 2011

Related U.S. Application Data

(60) Provisional application No. 61/049,564, filed on May 1, 2008.

(51) Int. Cl.
A47J 31/40 (2006.01)
A47J 31/32 (2006.01)
A47J 31/06 (2006.01)

(52) U.S. Cl.
CPC .............. *A47J 31/32* (2013.01); *A47J 31/0663* (2013.01)

(58) Field of Classification Search
CPC ......... A47J 31/24; A47J 31/32; A47J 31/043; A47J 31/0663; A47J 31/0657
USPC .............................. 99/287, 292, 302 R, 323.1
See application file for complete search history.

(56) References Cited

U.S. PATENT DOCUMENTS 373,420 A * 11/1887 Suits ............................. 422/275
2,569,820 A    10/1951 Locke
(Continued)

FOREIGN PATENT DOCUMENTS

CN   1935070    3/2007
DE   2432141    1/1976
(Continued)

OTHER PUBLICATIONS

Int'l Search Report and Written Opinion issued in PCT/US09/06268 (2010).
(Continued)

*Primary Examiner* — Reginald L Alexander
(74) *Attorney, Agent, or Firm* — Barnes & Thornburg LLP (57) ABSTRACT

An apparatus, system, and method of use in making beverages. The apparatus includes components and structures for making beverages by mixing heated water or other liquid and a beverage making substance in combination with controllable evacuation, pressurization, or both of a mixing vessel. The method includes controllable brewing using a vacuum, positive pressure, or both to control one or a combination of active controllable agitation of ingredients, steep time, pressurization, extraction time, agitation pulsing, dispensing pulsing as well as other numerous other beverage preparation characteristics and controls.

13 Claims, 3 Drawing Sheets

(56) References Cited

U.S. PATENT DOCUMENTS

| | | |
|---|---|---|
| 2,660,948 A | 12/1953 | Forschner |
| 3,288,049 A | 11/1966 | Schmid et al. |
| 3,552,976 A | 1/1971 | King |
| 3,992,983 A * | 11/1976 | Gasser et al. ............ 99/287 |
| 4,632,023 A | 12/1986 | King |
| 4,644,855 A | 2/1987 | Woolman et al. |
| 4,779,520 A | 10/1988 | Häuslein |
| 4,791,859 A | 12/1988 | King |
| 4,823,685 A | 4/1989 | Boumans et al. |
| 4,953,725 A * | 9/1990 | Gil Buj ............ 215/389 |
| 4,967,647 A | 11/1990 | King |
| 5,127,317 A | 7/1992 | Takayanagi et al. |
| 5,197,373 A | 3/1993 | De Jong |
| 5,297,472 A | 3/1994 | Suzuki et al. |
| 5,312,637 A | 5/1994 | Midden |
| 5,937,738 A * | 8/1999 | Okamura et al. ......... 99/302 R |
| 5,957,035 A | 9/1999 | Richter |
| 6,079,317 A | 6/2000 | Fukushima et al. |
| 6,220,147 B1 | 4/2001 | Priley |
| 6,250,208 B1 | 6/2001 | Helps et al. |
| 6,279,461 B1 | 8/2001 | Fukushima et al. |
| 6,324,964 B1 | 12/2001 | Niederberger et al. |
| 6,488,976 B1 | 12/2002 | Priley |
| 6,564,697 B2 | 5/2003 | Maxwell et al. |
| 6,722,265 B2 | 4/2004 | Priley |
| 6,887,506 B2 | 5/2005 | Kalenian |
| 6,973,869 B1 * | 12/2005 | Lin ............................ 99/275 |
| 7,717,026 B1 * | 5/2010 | Lassota ...................... 99/283 |
| 7,849,784 B2 | 12/2010 | Adler |
| 8,124,150 B2 | 2/2012 | Doglioni Majer |
| 8,286,547 B1 | 10/2012 | Lassota |
| 2006/0174773 A1 | 8/2006 | Taylor |
| 2006/0230946 A1 | 10/2006 | Cheng |
| 2007/0034083 A1 | 2/2007 | Van Hattem et al. |
| 2009/0317526 A1 | 12/2009 | Tacklind et al. |
| 2010/0203207 A1 | 8/2010 | Clark et al. |
| 2011/0097466 A1 | 4/2011 | Vastardis |

FOREIGN PATENT DOCUMENTS

| | | |
|---|---|---|
| FR | 1565033 | 4/1969 |
| JP | H01-234992 | 9/1989 |
| WO | WO 86/05670 | 10/1986 |
| WO | 88/02612 | 4/1988 |
| WO | WO 93/15640 | 8/1993 |

OTHER PUBLICATIONS

Office Action & Supplementary Search Report issued in App. No. EP09739979 (Dec. 2014).

* cited by examiner

AIR AGITATION CONTROLLABLE BEVERAGE MAKING APPARATUS, SYSTEM AND METHOD

CROSS REFERENCE TO RELATED APPLICATIONS

This application is a U.S. nationalization under 35 U.S.C. §371 of International Application No. PCT/US2009/042604, filed May 1, 2009, which claims priority under 35 U.S.C. §119(e) to U.S. Provisional Patent Application No. 61/049,564, filed May 1, 2008. The disclosures set forth in the referenced applications are incorporated herein by reference in their entireties, including all information as originally submitted to the United States Patent and Trademark Office.

BACKGROUND

The present disclosure relates to an apparatus, system, and method of use for producing beverages. The apparatus includes components and methods for facilitating beverage production applying heated water or other heated liquid in combination with pressurization of a mixing vessel or column. The system, apparatus, and method can be used with a variety of beverage making devices such as a device which might be used to controllably produce volumes of beverage to a reservoir. The method includes controllable pressurized column brewing which may include controlling steep time, pressurization, extraction time, active controllable agitation of the brewing substance, as well as other brewing characteristics.

Reference is made to U.S. Provisional Application No. 61/039,071 filed Mar. 24, 2008, and incorporated by reference in its entirety. Additionally, any applications related to Application Ser. No. 61/039,071 either as applications, non-provisional applications, or issued patents are incorporated herein by reference in their entirety.

Reference is also made to U.S. Provisional Application No. 61/100,537, filed Sep. 26, 2008 and incorporated by reference in its entirety. Additionally, any applications related to Application Ser. No. 61/100,537 either as applications, non-provisional applications, or issued patents are incorporated herein by reference in their entirety.

Reference is also made to PCT Patent Application Number US09/38125, filed Mar. 24, 2008 and incorporated by reference in its entirety. Additionally, any applications related to PCT Patent Application Number US09/38125 either as applications or issued patents are incorporated herein by reference in their entirety.

Reference is also made to U.S. Provisional Application No. 61/116,317, filed Nov. 20, 2008 and incorporated by reference in its entirety. Additionally, any applications related to Application Ser. No. 61/100,537 either as applications, non-provisional applications, or issued patents are incorporated herein by reference in its entirety.

A variety of beverage producing systems have been produced. One form of beverage production is referred to as "brewing". Brewing involves the dispensing of heated water into a brewing substance, such as coffee, tea, herbs, botanicals, as well as other substances. In the brewing process, the heated water infuses and extracts flavors from the brewing substance. The brewing substance and water is contained within a filter structure to allow beverage to drain from the infused brewing substance and water mixture.

A variety of brewing apparatus and systems have been developed. Drip brewing systems allow the beverage to drain through a filter under force of gravity. An example of a drip brewing system involves a brewing funnel which contains the brewing substance and receives water. The funnel may be lined with a filter material, either disposable or reusable. The brewing substance is placed in the filter of the funnel and water is dispensed over the brewing substance. Beverage drains from the filter through an opening in the funnel for dispensing into a cup or larger container such as a carafe.

Some automated systems have been developed which employ a brewing chamber constructed to approximate a funnel and filter structure. The automated mechanism includes a piston which moves through a central portion of the chamber to controllably open and close a drain area within the chamber. The controllable piston also includes a water line which can be used to controllably dispense water over brewing substance contained in the chamber. This system generally works on principles similar to the drip brewing system such that gravity is employed, at least in part, to drain beverage from the system.

Another form of brewing system involves a technique referred to as "French press". In a French press system coffee is placed in a container and water is pour over the coffee and is maintained in direct contact with the coffee for the duration of the brewing process. The heated water is mixed with the brewing substance to produce a beverage. A plunger which includes a filter portion is placed in the container and pressed downwardly over the water and brewing substance mixture. Beverage passes through the filter and remains on top of the filter with the remaining spent brewing substance being trapped between the filter and the bottom of the container. The brewed beverage can then be dispensed from the container.

Another prior art version of an automated brewing apparatus has often been used in the cup dispensing vending machine industry. This form of brewing technique uses a reverse, vacuum, or suction French press technique. In this vending system, coffee is dispensed into a brewing chamber. Water is combined with the coffee in the brewing chamber and may be allowed to steep. The piston is moved to draw the brewed beverage through a filter under force of suction, typically drawn from below the filter and allow brewed beverage to drain from the chamber. The spent grounds are then removed from the filter in preparation for subsequent brewing cycle.

One of the problems with some of the prior art techniques is that while they are capable of producing sufficient beverages, they will require significant interaction and control of numerous parts. Additionally, the numerous moving parts require contact with the brewing mixture or slurry. Additional contact components as well as moving components may require additional cost, maintenance, reliability and other issues.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Figure 1:
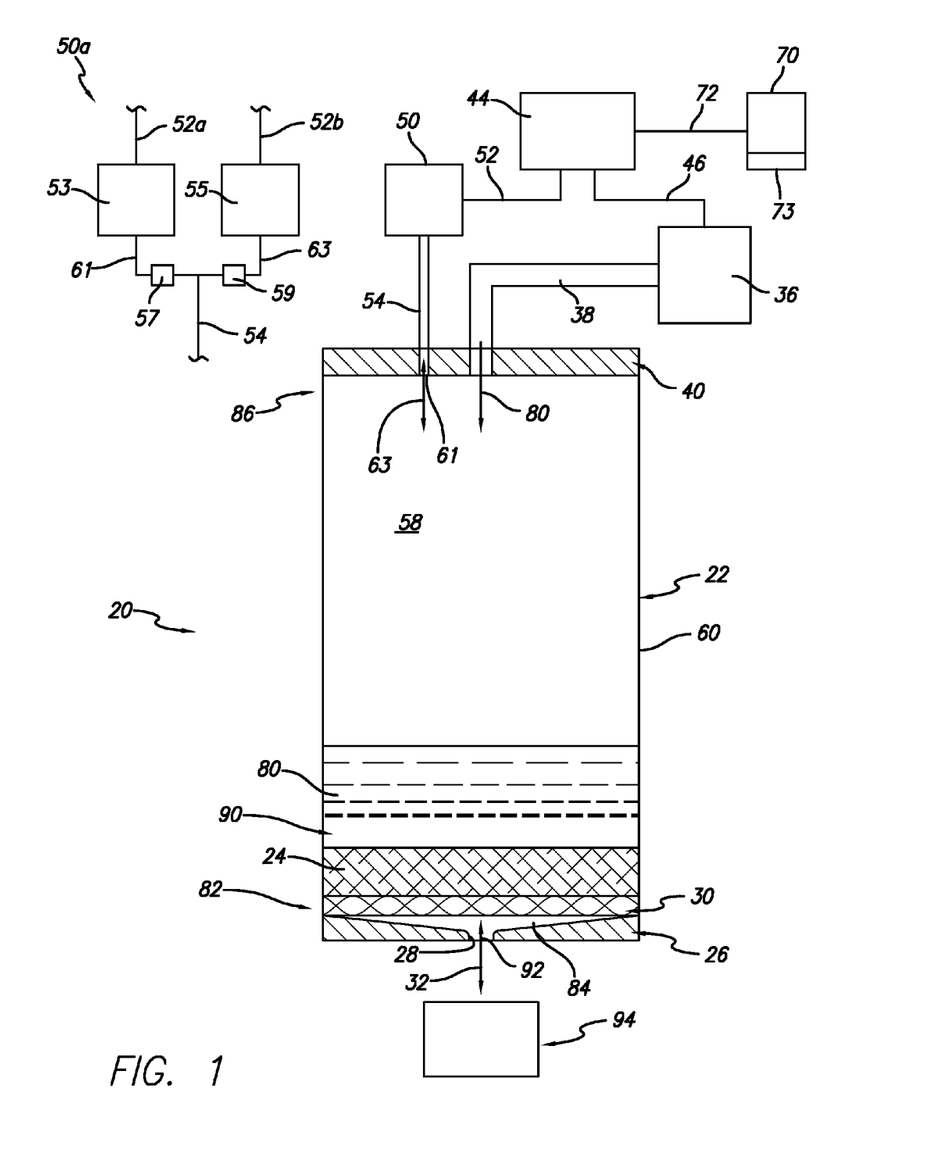
FIG. 1 is a diagrammatic illustration of a beverage producing apparatus which includes a heated water delivery system, an air moving device, a controller coupled to the water delivery system and the air moving device and a user interface coupled to the controller, a mixing vessel or column receives beverage making substance and water for mixture as a slurry for production of a beverage which is moved through a filter structure for dispensing into a container.

With reference to FIG. 1, a beverage making or producing and dispensing apparatus 20 is disclosed. The beverage producing and dispensing apparatus 20 includes an at least partially hollow mixing vessel or column 22 for receiving a charge of beverage making substance or material 24. The vessel 22 includes a first end shown in the illustration as a bottom 26 with an aperture 28. A filter structure 30 is provided between the beverage making substance 24 and the bottom 26 to facilitate separation of the beverage making substance 24 from beverage 32 dispensed through the aperture 28. The bottom 26 and a top 40 may be permanently or removably affixed to the vessel 22. In some applications of the apparatus 20 it may be desirable to allow the vessel 22 to be removed form the apparatus 20 for cleaning. A bottom is referred to only by way of illustration and not limitation. It will be understood that this term is to be broadly interpreted to include other orientations of the first end 26 of the present beverage making and dispensing apparatus 20.

A controllable liquid water delivery system 36 of generally known construction communicates with the vessel 22. For example, the water delivery system 36 can be in the form of a heated water system which can either be connected to a pressurized water source, can receive manually delivered quantities of water, or a combination of manual and automatic or controllable sources. The water delivery system 36 is associated with a device for heating the water and systems for controllably delivering it via line 38 through a second end shown in the illustration as a top 40 of the vessel 22. The water delivery system 36 is coupled to a controller 44 via line 46. The water delivery system may include a reservoir for retaining a volume of water in a heated condition and a heating element associated with the reservoir for providing energy to heat the water. The water delivery system may include a temperature sensor and a level sensor for detecting the condition of the water in the water delivery system to provide information for control of the water delivery system. Water is referred to only by way of illustration and not limitation. It will be understood that this term is to be broadly interpreted to include any liquid as well as any combination of liquid ingredients used in making beverages. A top is referred to only by way of illustration and not limitation. It will be understood that this term is to be broadly interpreted to include other orientations of the second end 40 of the present beverage making and dispensing apparatus 20.

An air moving system 50 is controllably coupled to the controller 44 over line 52. A passage 54 is coupled to the air moving system 50 to place the air mover 50 in controllable communication with an internal cavity 58 of the vessel 22. The cavity 58 is generally defined by at least one wall 60 of the vessel 22. The air moving system 50 is capable of controllably removing (61) air from the vessel 58 or introducing (63) air to the vessel 22. In other words, in one mode of operation the air moving system 50 can controllably create a negative pressure in the vessel 22 or draw a vacuum (61) on the cavity 58 of the vessel 22 by controllably removing the air in a vacuum mode of operation. Additionally, in another mode of operations the air moving system 50 can controllably create a positive pressure in the vessel 22, such as by controllably pumping air into (63) the vessel to pressurize (63) the cavity 58 in a pumping mode of operation.

A user interface 70 is coupled to the controller 44 over line 72 to facilitate the controlled operation of the apparatus 20. Additionally, the controller 44 can provide information to a user interface 70 such as by way of a visual, audio, or other display or feedback system. Additionally, any variety of communication interfaces 73 might be implemented at the user interface 70 or elsewhere coupled to and associated with the apparatus 20. Such a variety of interfaces might include card readers, RFID readers, barcode readers, biometric devices or any other form of device, now known or hereafter discovered and usable with the disclosed beverage producing and dispensing apparatus, which can provide information to or receive information from a user or other source for use in the beverage preparation process of the apparatus 20. The interfaces may be physical, wired, or wireless. The reference to the user interface 70 and communication interface 73 is intended to be broadly interpreted and not limited by the disclosure provided herewith.

The present disclosure is intended to be a broad disclosure relating to the structures and methods for producing beverage using the teachings of the present beverage producing and dispensing apparatus 20. The present disclosure should be understood to be applicable for use with a variety of manual, semiautomatic, or automatic beverage making apparatus including, but not limited to, brewing systems. One of skill in the art empowered with the teachings as provided herein can find utility and application for this disclosure in a variety of mechanisms and systems.

It should be noted that the present disclosure may refer to coffee in reference to beverage making substance throughout the remainder of the description in the interest of clarity and simplicity. It will be understood, however, that any form of beverage making substance may be used to produce a beverage and the term coffee is intended to be broadly interpreted. This broad interpretation is also intended to include, but is not limited to, beverage substances including but not limited to, coffee, tea, herbs, botanicals, liquid beverage concentrate, ground, pulverized, rough cut, whole, powdered beverage concentrate, flaked, granular, freeze dried or other forms of materials including, but not limited to, liquid, gel, crystal or obtain a desired beverage or other food product or any other forms of beverage substance or food products. Terms including beverage, brewed, brewing, brewing substance, brewed liquid, and brewed beverage as may be used herein are intended to be broadly defined as including, but not limited to, the brewing of coffee, tea, and any other beverages. This broad interpretation is also intended to include, but is not limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. Also, the volume or quantity of the beverage making substance used in the system or the beverage produced by the system is intended to be broadly interpreted and not limited to that as specifically disclosed and includes serving sizes ranging from single cup to multiple cup containers, shown generally by container 94.

With further reference to FIG. 1, the apparatus 20 is used in one example to produce a brewed beverage 32 by a process which infuses a beverage making substance 24 such as coffee with a brewing substance such as water 80. In this example, beverage making substance 24 is dispensed into the cavity 58 of the mixing vessel 22. The lower portion 82 of the vessel 22 is at least removably secured to a base 26 with the filter 30 positioned thereabove. In at least one embodiment, a gap 84 is provided between the filter 30 and a corresponding surface of the bottom for draining brewed beverage 32 through the filter 30 and from the vessel 22.

The upper portion, cover, or top 40 is at least removably attached to the upper area 86 of the vessel 22. The waterline or passage 38 and air passage 54 are at least removably coupled to the cover 40 and communicate with the cavity 58.

After brewing substance 24 is dispensed into the cavity 58 water 80 is dispensed from the water delivery system 36 via water delivery line 38. Water mixed with the beverage making substance 24 creates a slurry 90 or combination of water 80 and brewing substance 24. The heated water and coffee mixture allows the desirable characteristics of the coffee to be extracted therefrom and drained from the vessel 22 through the aperture 28.

The opening or aperture 28 in the base 26 is sized and dimensioned to allow beverage to flow from the vessel 22. In order to prevent water 80 and/or beverage 32 from flowing from the vessel prematurely, the air moving device 50 can be controlled by the controller 44 to create a negative pressure in the cavity 58, or in other words, a suction or vacuum through the aperture 28. The air moving device 50 can be controlled to maintain the slurry 90 in the cavity 58 with out dripping form the aperture 28 or creating a bubbling or agitation of air flowing through the slurry 90. In other words, the vacuum can be controlled to create a vacuum pressure which is generally equal to the forces, such as gravity, which would otherwise allow the beverage to flow from the aperture 28. The negative pressure controllably induced on the vessel by the air moving device 50 can be controllably increased to draw air 92 up through the aperture 28 and into the slurry 90. This tends to create a bubbling of the beverage making slurry which agitates the slurry in the vessel 22. The infusion of air into the slurry helps to promote full engagement of the beverage making substance and development of characteristics in the brewed beverage which is ultimately extracted from the slurry 90. Air drawn through the aperture 28 is exhausted from the system through the air moving device 50.

At a predetermined point of this process, the air moving device 50 can be operated to create a positive pressure in the cavity 58 thereby creating pressure in the open space above the slurry 90 to drive the slurry against the filter 30. As a consequence of the increase in pressure, beverage will be drained, driven, or otherwise separated from the slurry through the filter 30 and out through the aperture 28. The filter 30 is sized and dimensioned to allow beverage to drain therethrough but to retain a significant portion of the solid. It is anticipated that some portion of solids may pass through the filter as occurs with any brewing process but the filter can be sized and dimensioned to provide a desirable resultant brewed beverage. Beverage drained from the mixing vessel 22 flows into the container 94 positioned below the vessel 22.

The system as disclosed in FIG. 1 and throughout this disclosure provides a variety of control characteristics. As such the controller 44 can be programmed to operate the air moving device 50, the heated water delivery system 36, as well as various other features or controls throughout the system. For example, the controller 44 can control the volume of water dispensed by the water system 36, the timing of dispensing water into the vessel, the rate of pressuring the cavity 58 when positively pressurizing the cavity, the rate of draw or vacuum when the air moving device 50 operates to create a negative pressure in the cavity 58, steep time permitted during which the beverage making substance and water interact in the slurry 90 to enhance the infusion and extraction characteristics as well as other features.

During the brewing process, the introduction of water 80 creates some turbulence in the slurry 90 during the initial dispensing of water into the cavity 58. This allows for at least initial engagement of the beverage making substance 24 with the water 80 to improve, enhance, optimize, achieve or otherwise facilitate extraction of desirable characteristics from the beverage making substance 24. Additionally, the creation of negative pressure by the air moving device 50 can create additional turbulence within the slurry 90 to further controllably facilitate interaction of the beverage making substance 24 with the water 80. The interaction between the beverage making substance 24 and water in the slurry may be controlled to facilitate the extraction of desirable chemicals and compounds from the beverage making substance such as volatiles, oils, or particulates, as well as other flavor and aroma components. By use of the pressurized cavity 58 the dispensing of beverage 32 to the container 94 within the enclosed vessel helps assure that the maximum amount of flavor and aroma will be dispensed directly to the container 94. In this regard, at the end of the brewing cycle the air moving device 50 may operate for a predetermined additional period of time after dispensing of the beverage to help drive out additional aromas from the beverage making substance 24. Additionally, a small volume of air moving through the drained beverage making substance 24 may help to further drain the substance maximizing the beverage dispensed as well as facilitating some draining of the dispensed substance to facilitate easier removal from the vessel.

The apparatus 20 has been described in use by way of example but not limitation with reference to the beverage making substance 24 in the form of coffee. However, it is anticipated that other beverage making substances such as tea may be used to make beverages with the apparatus 20. In this regard, the ability to draw air 92 through the aperture 28 by use of the air moving device 50 may help enhance some of the characteristics enjoyed with tea. Some tea recipes or processes call for tea being brewed with the introduction of oxygenation. The present disclosure provides the ability to thoroughly oxygenate tea retained in a cavity 58. Additionally, this system may be useful to help compressed, rolled, capsulized, or otherwise contained tea products to bloom during the brewing process. In this regard, some of the blooming teas may benefit from the agitation and movement created by air being drawn through the aperture.

Additionally, the filter 30 not only filters the beverage making substance 24 during the dispensing cycle but also helps to act as a diffuser to diffuse air 92 drawn through the aperture 28. In this regard, a relatively significant volume of air will tend to spread through the gap 84 between the base 26 and the filter 30. The numerous openings in the filter 30 allow a diffusion of air being drawn up through the vessel 22. This helps to enhance the action of air bubbles moving through the slurry or other combination of beverage making substance 24 and water 80.

It has been found that some beverage making substances can be used more than once to dispense a desirable beverage.

For example, at the end of the brewing cycle, the beverage making substance may be retained in the vessel 22 for use at least one more time. As a result the beverage making substance 24 may be somewhat compressed against the filter 30. However, at the initiation of a brewing cycle the air moving device 50 can be operated to draw air through the aperture 28 with it being diffused by the filter 30. The diffused air passing through the filter 30 tends to lift and remove the beverage making substance from engagement with the filter thereby allowing the beverage making substance to be intermixed with the slurry or otherwise to enhance the extraction of desirable beverage components therefrom.

The use of air agitation may also help facilitate floating the beverage making substance 24 generally on top of the water after a period of being intermixed in a slurry 90. In this regard, some beverage making substances may tend to float on top of water at the end of a mixing cycle. The turbulent action of the air infused or otherwise introduced into the slurry 90 may enhance this float or separation. For those substances that tend to create this float or raft of material the creation of this float may facilitate extraction of beverage 32. In this regard, once the material floats on top of the surface of the resultant beverage, it may make extraction of the beverage easier. Additionally, by pressurizing the cavity 58 on top of the float of material the float of material may act as a plunger or piston to somewhat wipe down the internal surfaces of the walls 60 during the dispensing step.

As shown in FIG. 1, an embodiment of the air moving device "50a" is disclosed. In this device 50a, a pair of controllable air moving pumps or devices 53, 55 are provided. It may be useful to provide one positively pressurizing device or positive pressurizing pump 53 and one negatively pressurizing device, suction pump, or vacuum pump 55. Both devices are placed in communication with the top of the vessel, or otherwise connected via line 54 to the vessel 22 or may be individually connected through separate lines. If a single line 54 is used, directional check valves 57, 59 are correspondingly associated with lines 61, 63. These check valves 57, 59 help control and facilitate preferred directional movement of air through line 54 and not through the other device. For example, if the positive pressurizing pump 53 is used to drive air through the lines 61 and 54 to pressurize the cavity 58 the check valve 59 will close to prevent backflow through line 53 and the suction pump 55. This may also allow the use of different levels of precision or devices for these pumps 53, 55 in the interest of properly engineering the device for the intended use.

Figure 2:
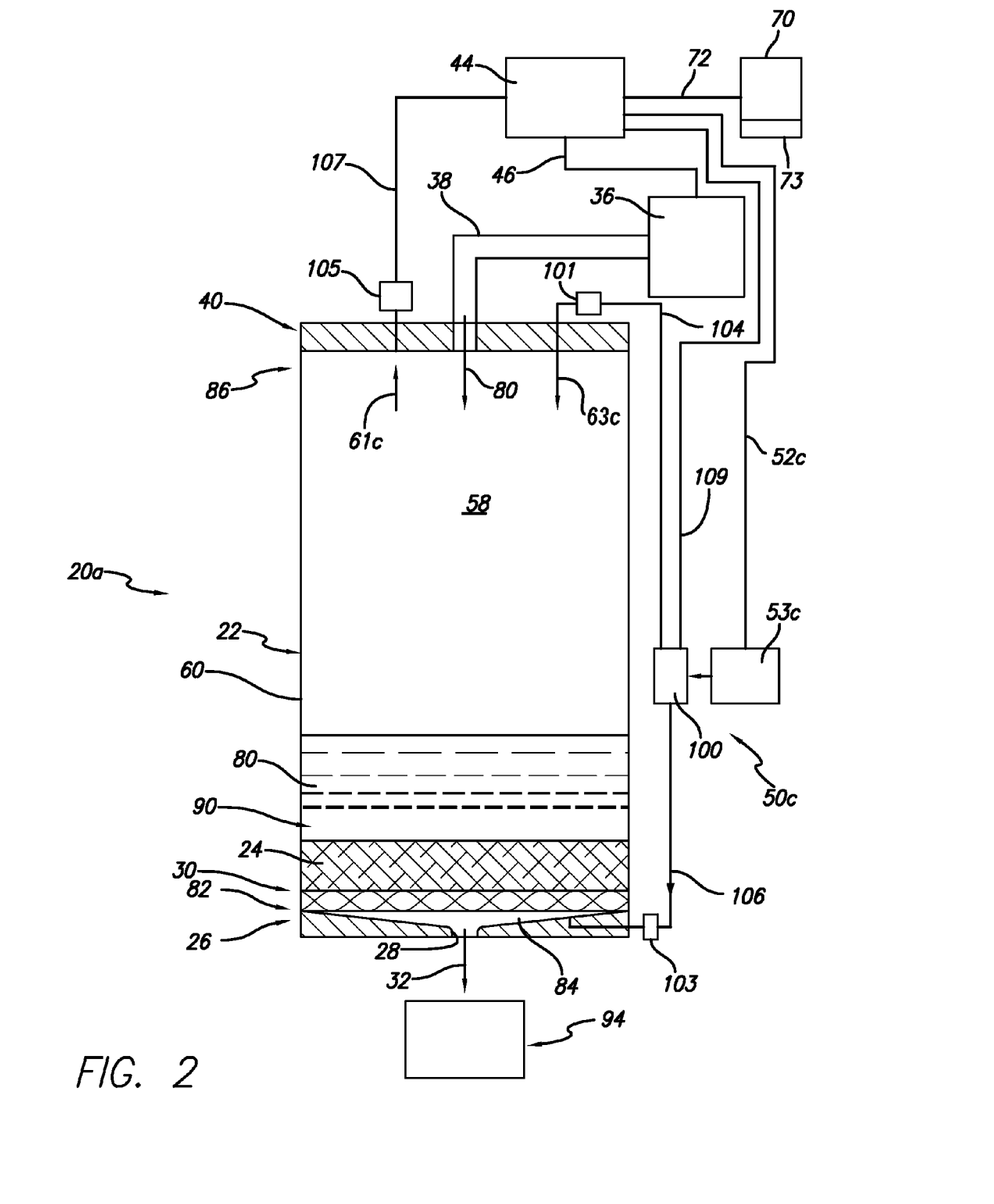
FIG. 2 is a diagrammatic illustration of a beverage producing apparatus similar to that as in FIG. 1 in which the air moving device has an alternate configuration for movement of air relative to the mixing vessel.

Turning now to FIG. 2, an apparatus 20a is shown. The apparatus 20a generally includes many of the same components as disclosed with reference to FIG. 1. However, the air moving device 50c provides an alternate embodiment whereby a diverter valve 100 can be controlled by the controller 44.

In the embodiment as shown in FIG. 2, the air moving device 50c includes the pump 53c to create a positive pressure. The diverter valve 100, is coupled 109 to the controller 44, is controlled to direct the positively pressurized air either upwardly through gap 84 as described hereinabove with reference to FIG. 1 or downwardly into the cavity 58 as also described above. This system 20a allows for a use of a single pump to positively pressurize air through the system without a suction or vacuum. This embodiment of the device requires the use of check valves 101, 103 appropriately coupled to the corresponding lines 104, 106 communicating with the diverter valve 100. Additionally, a check valve vent 105 may be provided to vent positive pressurized air 61c from the vessel 22. The vent 105 can be provided in a passive version which provides a mechanical vent operation. Alternatively, the vent 105 can be provided in an active version controllably coupled 107 to the controller 44. In general, similar operations and features will be associated with FIG. 2 as described above with regard to FIG. 1.

Figure 3:
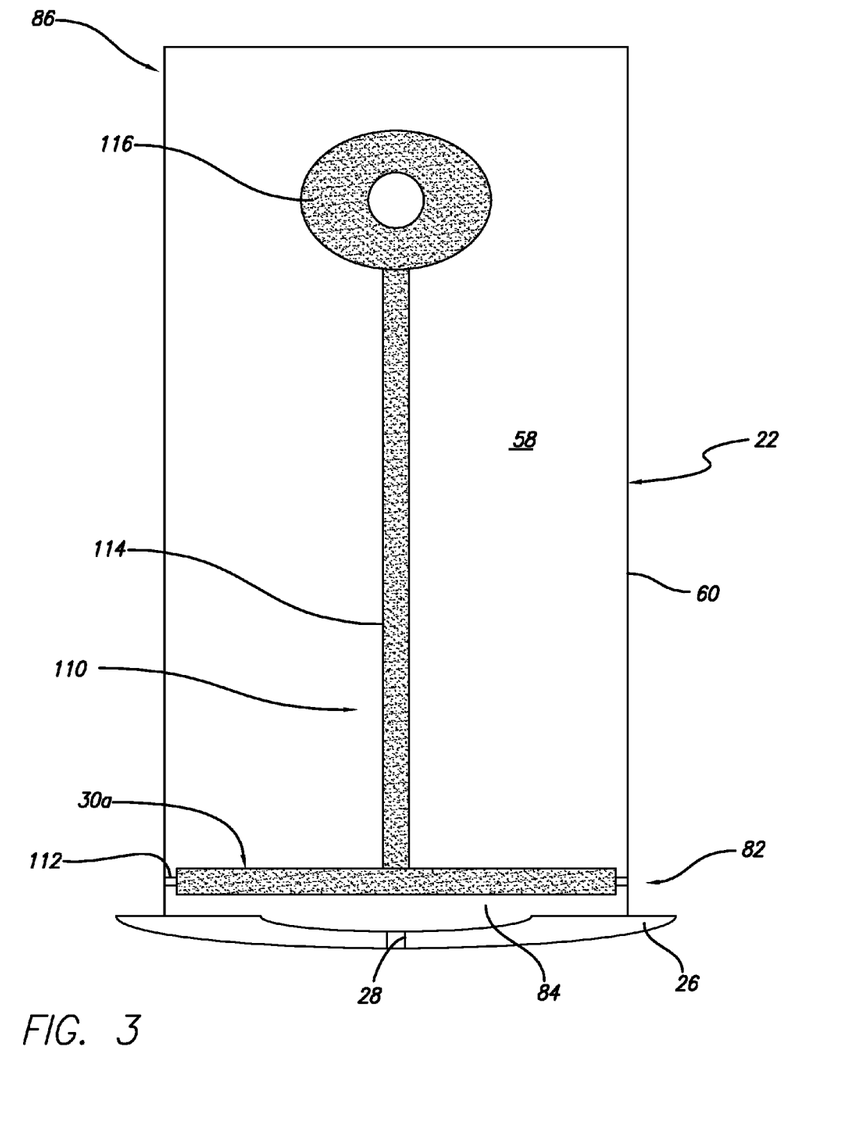
FIG. 3 is a diagrammatic illustration of an extraction device for providing removal and disposal of spent beverage making substance for use with the mixing vessel.

Turning to FIG. 3, a device for removal of spent beverage making substance is provided. In this regard, an extractor device 110 is provided. The extractor device 110 includes a version of the filter 30a as described in FIGS. 1 and 2. The filter 30a, however, is not connected to the base, the vessel, or retained between the base or vessel. Instead the filter 30a is movable within the vessel 22. The filter 30a includes a wiper seal 112 around the perimeter of the filter to engage the inside surface of the walls 60. A shaft 114 and grip 116 are coupled to the filter 30.

In use, the extraction device 110 is placed in the vessel prior to dispensing beverage making substance therein. Beverage making substance is then dispensed on top of the filter prior to the brewing cycle. The brewing cycle is carried out as described above with regard to the discussion of FIGS. 1 and 2. At the end of the brewing cycle the cover 40 can be removed whereby a user grabs the grip 116 and lifts up on the assembly 110. The wipers 112 engage the inside surface of the wall to facilitate thorough cleaning of the surfaces and the attached shaft 114 helps to lift the filter out of the vessel and also positions the grip 116 at a level which is convenient for a user. Once the extractor 110 is removed from the vessel it can then be moved to a location to dump the spent brewing substance therefrom and cleaned. The extractor 110 is then replaced to the vessel for future use.

In general use, the apparatus 20 is presented to the user for use in producing a beverage. Beverage making substance 24 is introduced into the vessel 22 either automatically using a dispensing system of generally known construction, or manually. Once the brewing substance 24 is placed in the vessel 22 on top of the filter 30 the brewing process can be initiated. The user operates an interface 70 to initiate the brewing process. The controller uses the selections by the user at the user interface 70 to produce a desired beverage. The controller 44 operates the water delivery system 36 to deliver water 80 to the cavity 58 for mixing with the beverage making substance 24. At the initiation of this brewing cycle, the air moving device 50 is activated by the controller 44 to initiate creating a suction, vacuum, or negative pressure on the cavity 58. Inducing the vacuum 61 on the cavity 58 causes air 92 to flow through the aperture 28 or at least creates a negative pressure to hold the liquid in the vessel. The pressure of the vacuum can be balanced by the controller to provide a generally neutral condition whereby beverage 32 does not flow out through the aperture nor does a significant or substantial amount of air 92 enter through the slurry. If the system is not capable of providing a dripless hold, it may be preferable to error on the side of drawing in air over allowing dripping. This controlled vacuum can be used to allow the beverage brewing substance 24 and water 80, combined in the slurry 90, to steep.

The controller 44 can initiate a control cycle associated with the air moving device 50 to create a controlled agitation of the slurry 90. Controlled agitation can include a generally continuous stream of air 92 flowing into the cavity, through the aperture 28, and slurry 90. The air moving device 50 can be controllably operated by the programming of the controller to be turned on and off or increased or decreased in pressure to create a pulsing agitation effect. The pulsing agitation effect may be useful in order to lift or agitate the slurry 90 and allow the particles of the beverage making substance to settle and continue to steep. The controller is designed to be preprogrammed, user programmed or a combination of both. The programming operates the apparatus and controls the dispensing of water and the air moving device in accordance with beverage making recipes or desired resultant extractions and flavor profiles and/or characteristics. The present apparatus may incorporate the BrewWise® technology developed by Bunn-O-Matic Corporation, the assignee of the present application. U.S. Pat. No. 7,223,427, issued May 29, 2007 includes disclosure of BrewWise® technology and is incorporated herein by reference in its entirety.

All versions of control cycle timing, pulsing and any other variation of control of the air moving device 50, are intended to be broadly included in the present disclosure. This broad disclosure of the control of the air moving device 50 is intended to be used with currently known recipes, standards, protocols, traditions, customs or any other brewing or beverage making technique currently known or hereafter developed or discovered which may be usable with and achieved by the air moving device 50.

Additionally, the air moving device 50 can be used to positively pressurize (63) the cavity 58 during the vacuum agitation process to allow some quantity of beverage 32 to be dispensed during the brewing cycle. Once again it is intended that the full control and broad interpretation of the air moving device 50 is intended to be included within this disclosure, including positive pressurization of the cavity 58. Additionally, the alternative version of the air moving device 50c is intended to be broadly interpreted based on the teachings provided herein.

At some point during the beverage making cycle based on the programming of the controller, sufficient control of the beverage making substance 24 and water 80 will be achieved and a preferred finished beverage is ready to be dispensed from the vessel 22. At this point the air moving device can be used to positively pressurize the cavity 58 of the vessel 22 to drive beverage 32 out of the vessel 22 through the aperture 28. As noted above, some degree of beverage making substance 24 may have risen to the upper level of the water 80 forming a type of piston or raft of material. Positively pressurizing this accumulation may act as a wiper to help facilitate removing beverage making substance from the wall 60 of the vessel 22.

At the end of the brewing cycle and dispensing beverage from the vessel 22, a continued flow of air 63 may be used to drive moisture from the spent brewing substance 24. This somewhat drained or dried brewing substance may be easier to remove from the vessel 22 than moist slurry.

The vessel 22 can then be removed from the apparatus 20 for cleaning. The top 40 and bottom 26, either alone or in combination can be releasably and reattachably removed from the vessel 22 to allow cleaning of the interior surfaces. The cleaning process can be carried out manually or in an automated version or some combination thereof keeping within the intended broad coverage of the present disclosure.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A beverage making apparatus comprising:
    a vessel attachable to and removable from the apparatus for receiving beverage making substance and liquid for mixing during a brewing process;
    a first end of the vessel;
    a second end of the vessel, spaced from the first end of the vessel;
    a wall of the vessel extending between the first end and the second end at least partially defining a cavity of the vessel;
    a controller;
    a liquid delivery system coupled to the controller and communicating with the vessel for controllably delivering liquid to the cavity of the vessel for combination with a beverage making substance;
    a drain opening positioned proximate the first end of the vessel to allow the passage of beverage from the vessel;
    an air moving system coupled to the controller and communicating with at least the cavity of the vessel for controllably agitating the mixture in the vessel, the air moving system comprising
        a pump for creating a negative pressure in the cavity that draws air through the liquid and beverage making substance, and
        a pump for creating a positive pressure in the cavity for driving the liquid and beverage making substance toward the drain opening.

2. The beverage making apparatus of claim 1, further comprising:
    a filter positioned proximate the first end of the vessel and the drain opening for at least facilitating separation of beverage from the mixture of beverage making substance and liquid mixed in the vessel.

3. The beverage making apparatus of claim 1, further comprising:
    a filter positioned in the cavity of the vessel at least partially overlying the drain opening.

4. The beverage making apparatus of claim 1, the liquid delivery system further comprising:
    a controllable heater coupled to the controller for controlling the heating of the liquid used for making beverage.

5. The beverage making apparatus of claim 1, the air moving system further comprising:
    a vacuum pump coupled to the controller and communicating with the cavity of the vessel for controllably creating a vacuum in the cavity of the vessel.

6. The beverage making apparatus of claim 1, the air moving system further comprising:
    an air pump coupled to the controller and communicating with the cavity of the vessel for controllably creating air movement in the cavity of the vessel.

7. The beverage making apparatus of claim 1, the air moving system further comprising:
    a vacuum pump coupled to the controller and communicating with the cavity of the vessel for controllably creating a vacuum in the cavity of the vessel;
    an air pump coupled to the controller and communicating with the cavity of the vessel for controllably creating air movement in the cavity of the vessel; and
    a controllable valve coupled to the controller and communicating with the vacuum pump and the air pump.

8. The beverage making apparatus of claim 1, wherein the first end is positioned proximate to a removable bottom selectively attachable and removable relative to the vessel.

9. The beverage making apparatus of claim 1, wherein a displaceable top is positionable relative to the second end of the vessel to selectively close and open the second end of the vessel.

10. The beverage making apparatus of claim 1, wherein the first end is positioned proximate to a removable bottom selectively attachable and removable relative to the vessel, and a displaceable top is positionable relative to the second end of the vessel to selectively close and open the second end of the vessel.

11. The beverage making apparatus of claim 1, further comprising:
a filter positioned proximate the first end of the vessel a gap being defined in a space between the drain opening and the filter, the air moving system communicating with the gap for controllably moving air into the gap, air passing through the filter being diffused for agitating the mixture in the vessel.

12. A beverage making apparatus comprising:
a vessel attachable to and removable from the apparatus for receiving a beverage making substance and liquid for mixing during a brewing process;
a first end of the vessel;
a second end of the vessel, spaced from the first end of the vessel;
a wall of the vessel extending between the first end and the second end at least partially defining a cavity of the vessel;
a controller;
a liquid delivery system coupled to the controller and communicating with the vessel for controllably delivering liquid to the cavity of the vessel for combination with a beverage making substance;
a drain opening positioned proximate the first end of the vessel to allow the passage of beverage from the vessel; and
an air moving system coupled to the controller and communicating with at least the cavity of the vessel for controllably agitating the mixture of beverage making substance and liquid in the vessel;
a first line communicating with the air pump and communicating with the cavity proximate to the first end of the vessel;
a second line communicating with the air pump and communicating with the cavity proximate to the second end; and
at least one controllable valve coupled to the controller and communicating with at least one of the first line, second line, cavity of the vessel, and the air pump.

13. A beverage making apparatus comprising:
a vessel attachable to and removable from the apparatus for receiving beverage making substance and a liquid for mixing during a brewing process;
a first bottom end of the vessel;
a second top end of the vessel, spaced from the first bottom end of the vessel,
a controller;
a wall of the vessel extending between the first bottom end and the second top end at least partially defining a vertically extending cavity of the vessel;
a liquid delivery system coupled to the controller and communicating with the vessel for controllably delivering at least a liquid to the vertically extending cavity of the vessel for combination with a beverage making substance;
a drain opening positioned proximate the first bottom end of the vessel to allow the passage of beverage from the vessel; and
an air moving system coupled to the controller and communicating with at least the second top end of the vessel for at least creating a vacuum in the cavity of the vessel for controllably agitating by moving air upward through the mixture in the vessel.

\* \* \* \* \*